United States Patent [19]

Fujita et al.

[11] Patent Number: 4,575,445
[45] Date of Patent: Mar. 11, 1986

[54] METHOD OF MANUFACTURE OF LONG COGGED V-BELTS

[75] Inventors: Kunihiro Fujita, Nishinomiya; Hideaki Tanaka, Kobe; Toshiaki Maebara, Kasugai, all of Japan

[73] Assignee: Mitsubishi Belting Ltd., Kobe, Japan

[21] Appl. No.: 682,429

[22] Filed: Dec. 17, 1984

[30] Foreign Application Priority Data

Dec. 15, 1983 [JP] Japan .................. 57-236538

[51] Int. Cl.$^4$ .................................. B29H 7/22
[52] U.S. Cl. ...................... 264/291; 425/28 B; 264/231; 264/320
[58] Field of Search ............ 425/28 B, 34 B; 264/231, 241, 320

[56] References Cited

U.S. PATENT DOCUMENTS

| | | | |
|---|---|---|---|
| 2,602,188 | 7/1952 | Gorecki | 425/28 B |
| 3,477,895 | 11/1969 | Sauer | 425/28 B |
| 4,042,443 | 8/1977 | Hoback et al. | 425/28 B X |
| 4,359,355 | 11/1982 | Stecklein et al. | 425/28 B X |

*Primary Examiner*—J. Howard Flint, Jr.
*Attorney, Agent, or Firm*—Wood, Dalton, Phillips, Mason & Rowe

[57] ABSTRACT

A method of forming a long cogged power transmission belt including extending a continuous looped vulcanizable belt preform element about a pair of axially parallel spaced support members, press-forming a first preselected length portion of the element disposed between the support members to form a first longitudinally extending series of cogs therein, vulcanizing the press-formed portion, press-forming a second, similar length portion of the element extending from the first portion and disposed between the support members to form a second longitudinally extending series of cogs therein continuing from the first series, vulcanizing the second press-formed portion, repeating the press-forming and vulcanizing operations if necessary until a final unformed portion of the belt extending from the last formed series of cogs and disposed between the support members has a length less than the preselected length, longitudinally stretching the final unformed portion to cause it to have a length approximately equal to the preselected length, press-forming the stretched final unformed portion to form a final longitudinally extending series of cogs therein to define a continuous series of substantially uniformly spaced cogs along the entire length of the looped element, and vulcanizing the final series of cogs.

24 Claims, 15 Drawing Figures

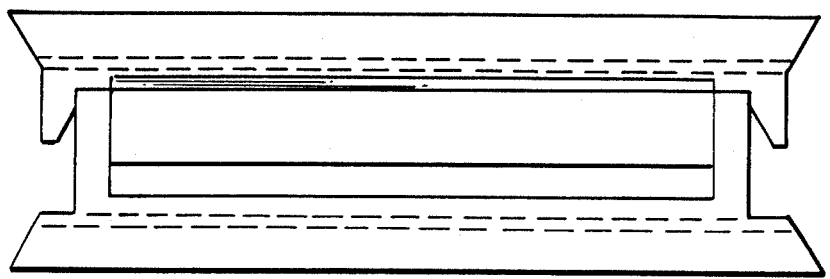
FIG. 11
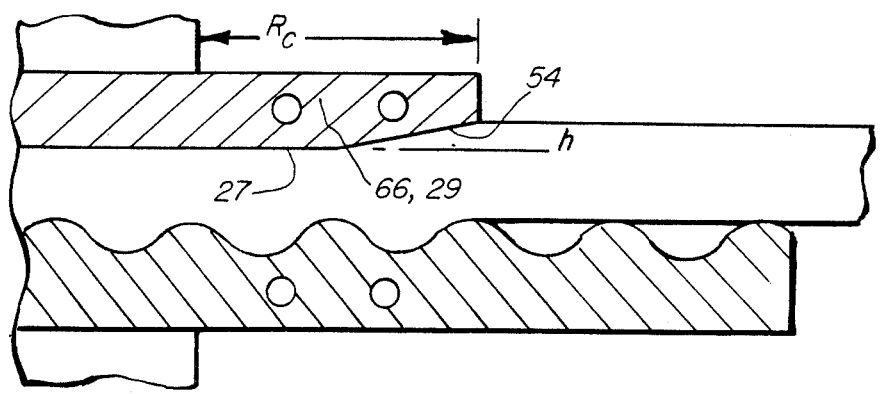
FIG. 12
FIG. 13
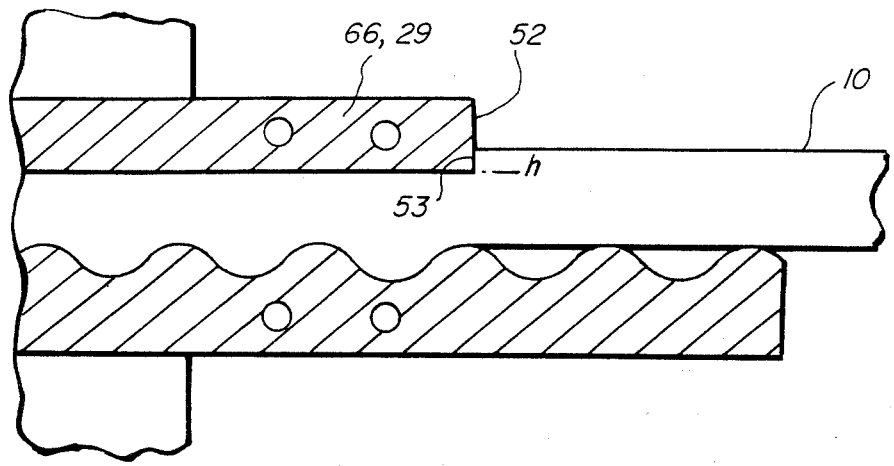

METHOD OF MANUFACTURE OF LONG COGGED V-BELTS

DESCRIPTION

1. Technical Field

This invention relates to manufacture of power transmission belts and in particular to the manufacture of relatively long cogged power transmission belts.

2. Background Art

One conventional method of manufacture of a continuous cogged power transmission belt, such as a V-belt, comprises forming a cylindrical mandrel with suitable grooves and then forming, in situ, about the mandrel a continuous loop of belt forming material which may be laid up in layers in the conventional manner. In one such manufacture, a preformed pattern is wrapped about the mandrel, or drum. The structural materials are then in layers about the pattern and a cylindrical sleeve is placed around the layers for final forming of the cogged belt by in situ vulcanization.

It is conventional in practicing such manufacture to utilize an elongated cog pattern which is cut to size and wrapped around the mandrel to form the endless cogged pattern. It has been found difficult, however, to provide accurately precise spacing of the projections of the cogged pattern and particularly such irregularities occur at the joint between the two ends of the pattern wrapped about the drum.

Another problem in such manufacture is the difficulty of utilization thereof where relatively long lengths of belts are required, as the drum construction becomes excessively large and the vulcanizing process is quite difficult.

Another known manufacture of such cogged belts comprises progressive forming of the belt by utilizing platelike cogged molds. The molds are utilized in conjunction with a continuous vulcanizable belt preform element and progressively are associated with successive portions of the belt preform until the entire length of the belt preform is provided with the desired cogged teeth. A problem arises, however, in this manufacturing technique in that the final portion of the belt preform does not, in almost all cases, constitute an accurate multiple of the desired cog pitch and, thus, fractional teeth are formed, so that the belt tends to deform or break at this portion. This is a particularly vexatious problem where relatively long belts are to be manufactured, as cumulative errors in the successive cog-forming steps may readily occur.

DISCLOSURE OF THE INVENTION

The present invention comprehends an improved method of manufacture of such relatively long cogged belts wherein a novel method of assuring accurate formation of the final cogged teeth is provided.

The invention further comprehends such an improved method of manufacture of cogged power transmission belts wherein the final portion of the belt to be formed with teeth is caused to have a length less than the final length and that belt portion is stretched prior to the forming of the final cog teeth therein so as to have a length accurately corresponding to the pitch multiple necessary to provide completely formed teeth at both ends of the final portion of the belt.

More specifically, the invention comprehends the provision of a method of forming a cogged belt structure including the steps of (a) extending a continuous looped vulcanizable belt preform element about a pair of axially parallel spaced support members, (b) press-forming a first preselected length portion of the element disposed between the support members to form a first longitudinally extending series of cogs therein, (c) vulcanizing the press-formed portion, (d) press-forming a second, similar length portion of the element extending from the first portion and disposed between the support member to form a second longitudinally extending series of cogs therein continuing from the first series, (e) vulcanizing the second press-formed portion, (f) repeating steps (d) and (e) if necessary until a final unformed portion of the belt extending from the last formed series of cogs and disposed between the support members has a length less than the preselected length, (g) longitudinally stretching the final unformed portion to cause it to have a length approximately equal to the preselected length, (h) press-forming the stretched final unformed portion to form a final longitudinally extending series of cogs therein to define a continuous series of substantially uniformly spaced cogs along the entire length of the looped element, and (i) vulcanizing the second series of cogs.

The invention further comprehends an improved apparatus for forming a cogged belt structure including means for extending means for extending a continuous looped vulcanizable belt preform element about a pair of axially parallel spaced support members, means for press-forming a first preselected length portion of the element disposed between the support members to form a first longitudinally extending series of cogs therein, means for vulcanizing the press-formed portion, means for causing said press-forming means to press-form a second, similar length portion of the element extending from the first portion and disposed between the support member to form a second longitudinally extending series of cogs therein continuing from the first series, means for causing the vulcanizing means to vulcanize the second press-formed portion, means for causing the repeating of the press-forming and vulcanizing steps by the press-forming and vulcanizing means until a final unformed portion of the belt extending from the last formed series of cogs and disposed between the support members has a length less than the preselected length, means for longitudinally stretching the final unformed portion to cause it to have a length approximately equal to the second preselected length, means for causing the press-forming means to press-form the stretched final unformed portion to form a final longitudinally extending series of cogs therein to define a continuous series of substantially uniformly spaced cogs along the entire length of the looped element, and means for causing the vulcanizing means to vulcanize the final series of cogs.

The invention further comprehends that the length of the looped element and the preselected length of the final unformed portion are correlated so that the length of the final unformed portion is in the range of approximately 60% to 85% of the preselected length.

The invention further comprehends the use of a pair of mold plates for press-forming the element portions by compression of the portions seriatim therebetween.

Means are provided at the opposite ends of the mold plates for engaging the previously formed cogs at the opposite ends of the stretched final unformed portion to maintain its stretch to the preselected length during the final vulcanization step.

The step of stretching the final unformed portions comprises a step of holding the end of the last previously formed series of cogs adjacent the final unformed portion and pulling the element at the opposite end of the final unformed portion away from the held end until the length of the final unformed portion is the desired preselected length.

In carrying out the invention, it is desirable to cause the cogs at opposite ends of each of the series to be only partially vulcanized during the vulcanization of that series.

The vulcanization of the final series causes complete vulcanization of the cogs at the opposite ends thereof by repeating the partial vulcanization of those cogs as the end cogs of the final series.

In the illustrated embodiment, the stretching of the final unformed portion is effected by increasing the spacing between pulleys about which the belt preform is disposed.

In the illustrated embodiment, one of the mold plates is formed with a series of grooves to define a series of cogs, and the other of the mold plates has a length less than the cog mold plate so that an end portion of the adjacent series of cogs may be received in the grooves outboard of the second mold plate during the press-forming and vulcanization operations.

In one embodiment, the face of the noncogged mold plate is beveled at the longitudinally opposite ends thereof.

The opposite ends of the mold plates may be provided with cooling means to effect the desired only partial vulcanization of the end cogs of the respective series.

The teeth at the opposite ends of the final series may be clamped to the cogged mold plate after the final portion is stretched to the desired length so as to maintain the desired length of the final portion during the final press-forming and vulcanization steps.

The invention comprehends that the belt preforms may comprise individual V-belt preforms, or a wide preform belt subsequently cut to individual V-belt configurations in the conventional manner, as desired.

The method and apparatus of the present invention are extremely simple and economical while yet providing an improved relatively long cogged belt manufacture wherein the cogged teeth are spaced accurately at the desired pitch at all portions of the belt including the final formed portion in utilizing the progressive mold plate forming technique.

BRIEF DESCRIPTION OF THE DRAWING

Other features and advantages of the invention will be apparent from the following description taken in connection with the accompanying drawing wherein:

FIG. 11 is a transverse section illustrating a modified form of pressure mold plate;

FIG. 12 is a fragmentary enlarged longitudinal section thereof;

FIG. 13 is a fragmentary enlarged longitudinal section illustrating the cause of a shoulder mark in the formed belt structure which is eliminating by the improved structure of FIG. 12;

BEST MODE FOR CARRYING OUT THE INVENTION

Figure 1:
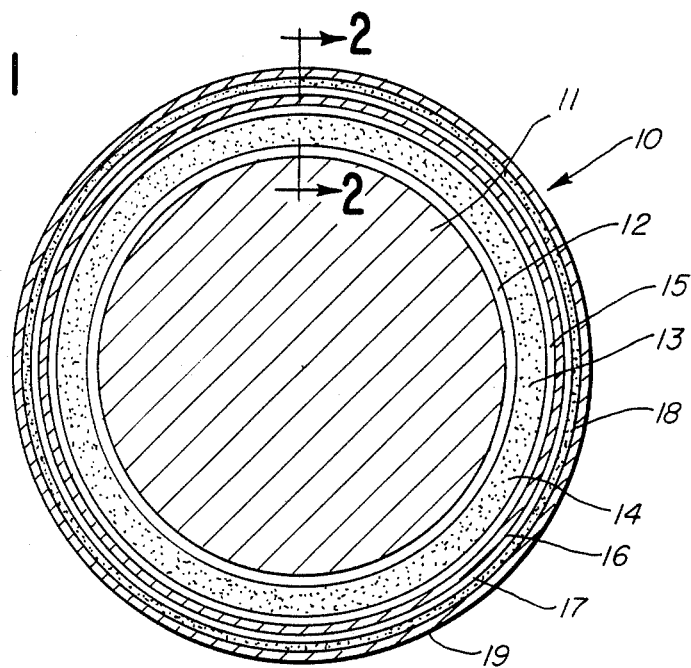
FIG. 1 is a transverse section of a drum illustrating the forming of a belt preform thereon for use in carrying out the manufacture of the invention.
Figure 2:
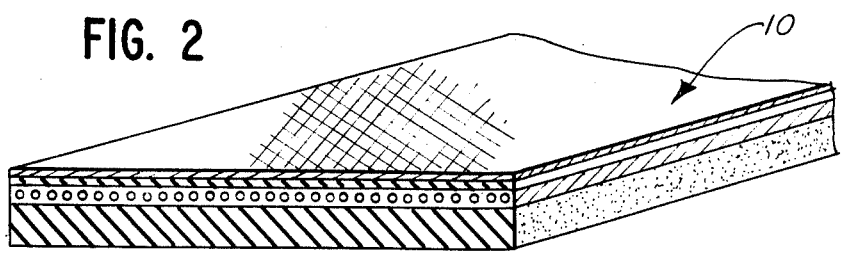
FIG. 2 is a fragmentary transverse section of the belt preform.

In the illustrative embodiment of the invention as disclosed in the drawing, a belt preform generally designated 10 is formed in situ on a drum 11. A rubber sleeve 12 is firstly placed about the drum. A rubber layer 13 is wrapped about the sleeve 12. The rubber layer may include short, transversely oriented staple reinforcing fibers 14. A lower cushion rubber sheet 15 is wrapped about the first sheet 14, a tensile cord 16 is spirally wrapped about the lower cushion rubber under a preselected tension, an upper cushion rubber sheet 17 is wrapped about the spirally wrapped tensile cord, and an outer core rubber sheet 18 is wrapped about the outer cushion rubber sheet 17. At least one sheet of rubberized elastic duck 19 is wrapped about the outer core rubber sheet 18.

Figure 3:
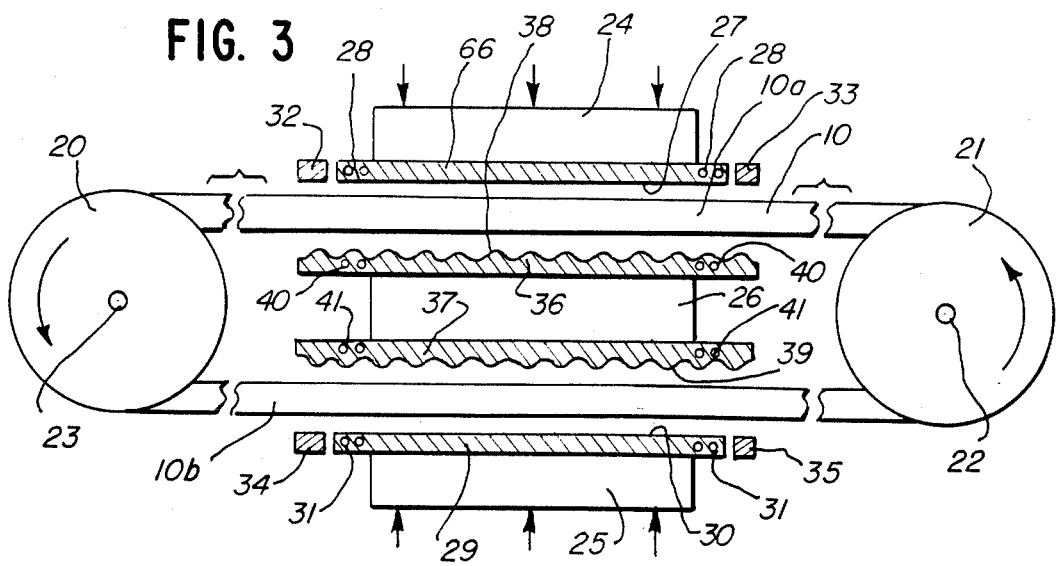
FIG. 3 is a schematic diagram illustrating the arrangement of the belt preform and mold plates of the present invention in carrying out a first step in the manufacture of the relatively long cogged belt.

The unvulcanized belt 10 is removed from drum 11 and entrained about a pair of axially spaced pulleys 20 and 21, as seen in FIG. 3. In the illustrated embodiment, the axle 22 of pulley 21 is displaceable away from and toward the axle 23 of pulley 20 so as to stretch the belt preform 10, when desired.

The cogged teeth forming means comprises a pair of platen 24 and 25 outwardly of the belt 10 and a platen 26 intermediate the two lengths 10a and 10b of the belt preform extending between the pulleys 20 and 21.

The upper platen 24 carries an outer mold plate 66 having a flat inner surface 27 and cooling means 28 at its opposite ends.

The lower platen 25 carries a similar outer mold plate 29 having a planar inner surface 30 and cooling means 31 at its opposite ends. Outboard of the opposite cooling ends 28 are a pair of clamp plates 32 and 33 and outboard of the opposite ends 31 of mold plate 29 are a corresponding pair of clamp plates 34 and 35.

Inner platen 26 carries a first inner mold plate 36 confronting mold plate 66 and a second inner mold plate 36 confronting mold plate 29. Mold plate 36 defines a serpentinely grooved face 38 and mold plate 37 defines a similarly serpentinely grooved face 39 corresponding to the desired cogged tooth configuration of the final cogged belt to be manufactured.

As shown in FIG. 3, mold plate 36 is provided adjacent its opposite ends with cooling means 40 and mold plate 37 is provided adjacent its opposite ends with cooling means 41.

Figure 8:
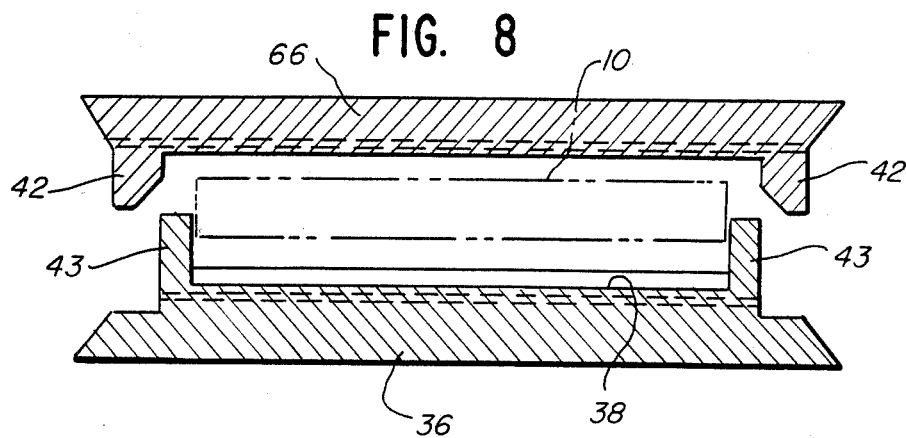
FIG. 8 is an enlarged transverse section of the mold plates.

As shown in FIG. 8, mold plate 66 may be provided at its opposite edges with downturned flanges 42 embracing corresponding upturned flanges 43 on the groove mold plate 36 for enclosing the preform belt 10 during the molding operation.

The belt preform is provided with a plurality of series of cog teeth by the successive molding of teeth therein between the mold plates in the known manner. Thus, a first set of teeth may be formed in the inner surface of the belt preform by the movement of the mold plate 66 downwardly toward mold plate 36 so as to press-form the desired cog teeth in the inner surface of the belt preform element. Heat may be applied to the platen 24 so as to effect vulcanization of the cog toothed portion so press-formed between the mold plates. The cooling means at the opposite end of the outer mold plate prevents a complete vulcanization of the teeth at the opposite ends of the series.

Upon completion of the vulcanization step, the pulleys are rotated, such as in the direction of the arrows, as seen in FIG. 3, so as to bring a next portion of the belt preform into alignment with the mold plates. In this step, the trailing teeth of the first formed series are caused to engage the grooves of the mold 36 in alignment with the cooling means 28 at the lefthand end of the mold plate 66, as seen in FIG. 23, so that final vulcanization of the partially vulcanized end teeth of the previous series may be effected during the vulcanization of the next series of teeth between the mold plates 66 and 36.

As will be obvious to those skilled in the art, a concurrent similar formation of cog teeth in the length 10b of the belt preform may be effected concurrently with the above described formation of teeth in the illustrated upper length 10a so that the complete cogged belt may be formed in one-half the time normally required where only a single set of mold plates is utilized.

As indicated above, the invention comprehends means for assuring that the final series of teeth formed between a first formed series of teeth and a last subsequent formed series of teeth will have accurate pitch between each of the cog teeth of the final formed series. To effect such desirable accurate formation of the final cogged teeth, the invention comprehends preselecting the length of the final portion of the belt preform to be less than the length of the desired series. In the illustrated embodiment, the length of the final portion is preselected to be approximately 60% to 85% of the preselected series length. This final portion of the belt preform is then stretched so as to have a length accurately conforming to the preselected series length, permitting the final press-forming and vulcanization steps to form teeth in the final portion of the belt which are accurately of the desired pitch throughout so that the entire belt, when fully vulcanized and formed, will have accurately similar pitch between all teeth thereof.

Figure 4:
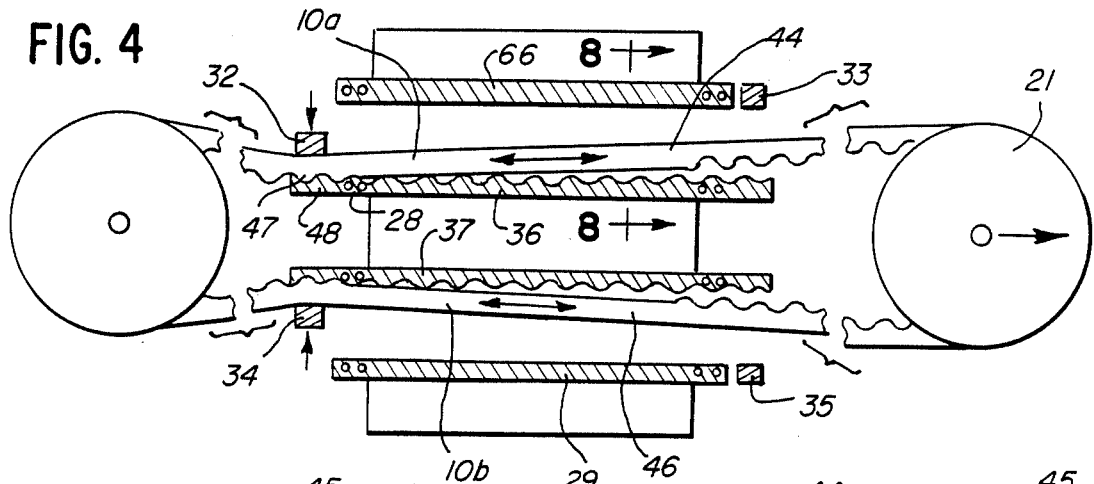
FIG. 4 is a schematic diagram illustrating a further step in the manufacture wherein the final portion of the belt to be provided with the cogged teeth by the mold plates is stretched to accurately locate the previously formed cogged teeth at the opposite ends thereof so as to provide a continuing series of cog teeth of uniform pitch throughout the length of the belt.
Figure 5:
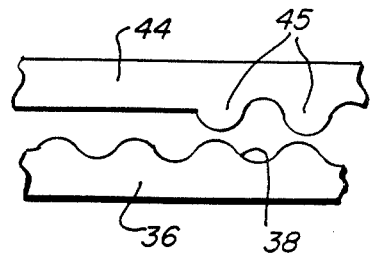
FIG. 5 is a fragmentary elevation illustrating the disalignment of the previously formed cogged teeth relative to the cogged mold plate prior to the stretching operation.
Figure 6:
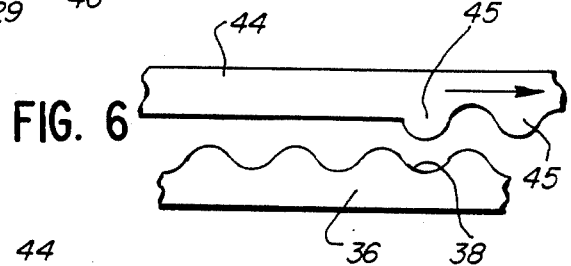
FIG. 6 is a fragmentary elevation illustrating the arrangement of the previously formed cogged teeth as a result of the stretching illustrated in FIG. 4.

To this end, pulley 21 is caused to be variably spaced from pulley 20 and, in the illustrated embodiment, as indicated above, axle 22 of pulley 21 is displaceable away from axle 23 of pulley 20 by any suitable means, as will be obvious to those skilled in the art, so as to stretch the final unformed portion 44 of the belt, as illustrated in FIG. 4, suitably to bring the end teeth 45 thereof from disalignment with the grooved surface 38 of the mold 36, as seen in FIG. 5, to alignment therewith, as seen in FIG. 6. At the same time, a similar stretching of the final unformed portion 46 of the belt portion 10b is effected so that each of the final unformed portions 44 and 46 is concurrently made to have a length accurately corresponding to the desired length of the series of cog teeth formed by the mold plates 36 and 37, respectively.

The alignment of FIG. 6 may be determined visually or by any suitable sensing means, as will be obvious to those skilled in the art.

More specifically, as seen in FIG. 4, in effecting the stretching of the belt portion 44 by the translated pulley 21, the toothed portion 47 of the last formed series of teeth is clamped to the end portion 48 of the mold 36 by the clamping means 32 outboard of the cooling means 28. As will be obvious to those skilled in the art, a reversely similar clamping of the leading teeth of the first series of teeth produced by mold 36 may be clamped by the clamp 34 at the lefthand end of mold plate 37, as seen in FIG. 4.

Figure 7:
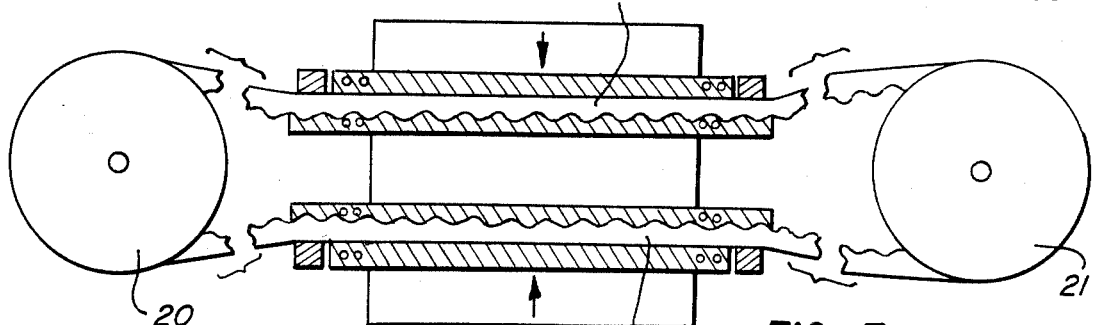
FIG. 7 is a schematic elevation illustrating a further step in the forming of the cogged belt.

When the end teeth of the previously formed series are aligned with the end grooves, as illustrated in FIG. 6, the opposite clamping plates 33 associated with mold plate 36 and 35 associated with mold plate 37, may be brought toward the end portion of the mold plates 36 and 37, respectively, to clamp the aligned previously formed teeth to the ends of the mold plates 36 and 37, thereby maintaining the length of the final unformed portion of the belt preform accurately the necessary length to provide accurate similarly in pitch between the cog teeth and the final formed series. Thus, the complete the formation of the belt at this time, the mold plates 66 and 29 are brought into engagement with the outer surfaces of the final portion of the belt preform sections 10a and 10b and the final steps of press-forming and vulcanization is completed, as seen in FIG. 7.

Figure 10:
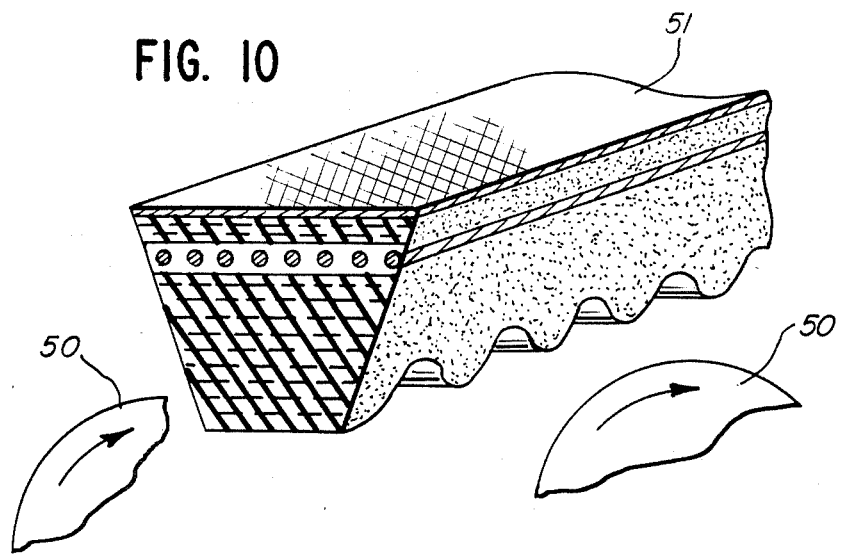
FIG. 10 is a fragmentary perspective view illustrating the step of cutting individual V-belts from the wide belt preform subsequent to the completion of the forming of the cog teeth therein.

Upon completion of the forming of the cogged teeth throughout the length of the belt preform, the belt preform may be removed from the pulleys and individual V-belts cut therefrom as by suitable knives 50 in the conventional manner, as shown in FIG. 10, in forming the final raw-edged V-belts 51 having uniform pitch through the length thereof, notwithstanding the substantial length thereof.

Figure 9:
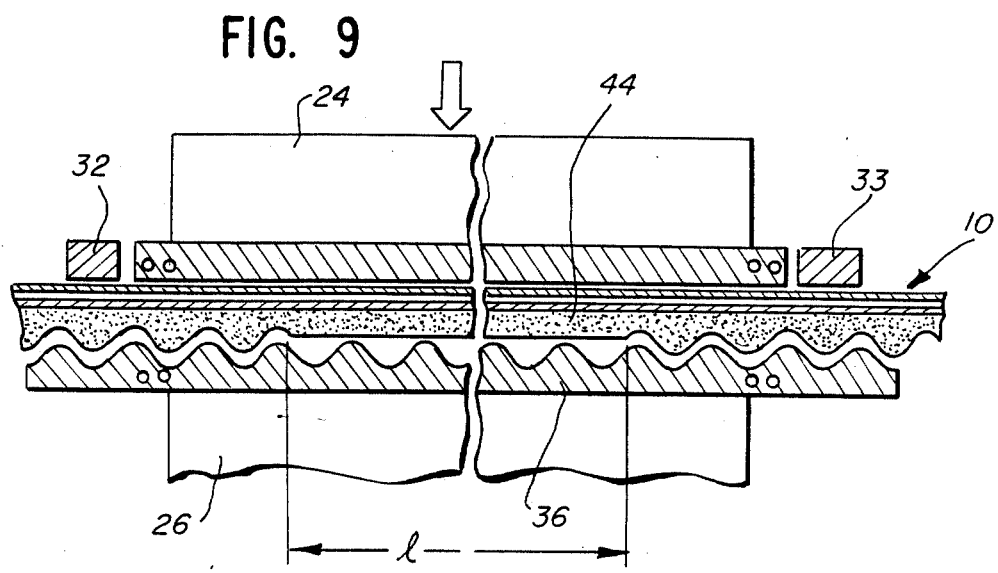
FIG. 9 is an enlarged section illustrating the arrangement of the belt and mold plates immediately prior to the clamping of the end cogs to the cogged mold plate.

As shown in FIG. 9, the length of the final unformed portion, such as portion 44 identified as "1", is preferably in the range of approximately 60% to 85% of the length of the cog tooth series formed by the mold plates. Thus, a sufficient amount of material is available for stretching to the final aligned configuration of FIG. 6. It has been found that maintaining the stretching factor, as indicated above, produces excellent cog tooth configuration, eliminating the problems of the prior art.

As shown in FIG. 13, where the opposite ends 52 of the outer mold plates 66,29 are perpendicular to the transverse extent of the belt preform 10, a notch mark 53 may be formed as a result of the embedment of the mold plate end portion 52 in the unvulcanized preform material. It has been found that the provision of a bevel, such as bevel 54 illustrated in FIG. 12, at the opposite ends of the inner surface 27 of the outer mold plate, effectively eliminates the notch mark 53. In the illustrated embodiment, the height h of the bevel corresponding to the depth of penetration of the mold plate 66,29 into the unvulcanized belt preform 10 is preferably related to the length $l_c$ of the cooling section by the formula $2 h/l_c = 0.05$ to $0.40$.

Figure 14:
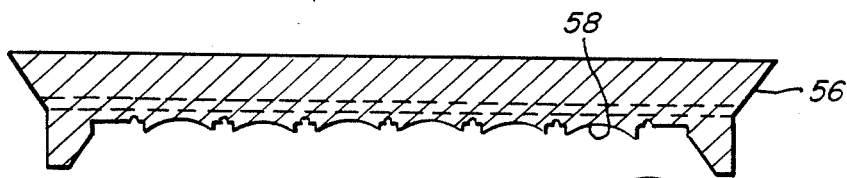
FIG. 14 is a transverse section of a pair of mold plates for use in practicing the invention where individual V-belts are formed concurrently.
Figure 15:
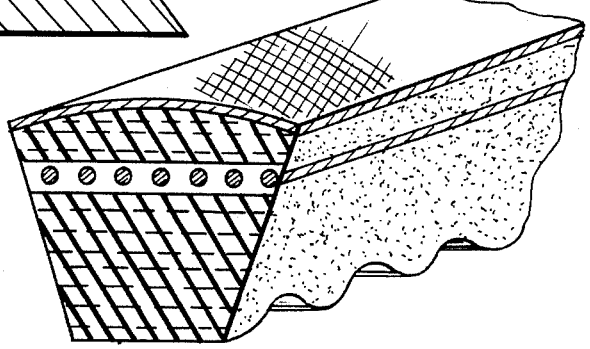
FIG. 15 is a fragmentary perspective view of a V-belt manufactured by means of the mold plates of FIG. 14.

Referring now to the embodiment of FIGS. 14 and 15, a modified form of mold plate structure is illustrated to comprise an inner mold plate 55 and an outer mold plate 56 defining longitudinally extending recesses for receiving individual V-belt preforms cut from the belt preform 10. Thus, mold 55 is provided with a plurality of longitudinally extending side-by-side V-belt receiving grooves 57 and mold plate 56 is provided with a corresponding plurality of pressure surfaces 58 for press-forming the preformed V-belt elements received in the grooves 57 upon association of the upper mold plate 56 with the lower mold plate 55. Upon completion of the forming of the cog teeth in the final portions of the V-belt preforms, the manufacture of the individual belts is completed. Thus, the final V-belt 59, as shown in FIG. 15, will have a constant pitch throughout the length thereof effected in the same manner as discussed above relative to the first embodiment. The difference between the manufacturing operation represented by FIGS. 14 and 15 and the first described embodiment resides in the slitting of the preform belt element prior to the cog teeth manufacturing steps in lieu of the slitting of the preform band element 10 subsequent to the forming of the cog teeth throughout the length thereof, as described relative to the first embodiment. In all other respects, the manufacture utilizing the molds plates 55 and 56 is similar to the manufacture as described relative to the first embodiment.

Thus, the invention comprehends an improved, simplified manufacture of relatively long cogged tooth power transmission belts and, in particular, raw edge V-belts. The invention comprehends such a manufacture wherein the cogged teeth have a uniform pitch throughout the length of the belt as a result of the novel improved manufacturing process.

We claim:

1. The method of forming a cogged belt structure comprising the steps of:
    (a) extending a continuous looped vulcanizable belt preform element about a pair of spaced support members;
    (b) press-forming a first preselected length portion of the element disposed between a pair of press-forming members to form a first longitudinally extending series of cogs therein;
    (c) vulcanizing the press-formed portion;
    (d) advancing the belt to bring a second, similar length portion of the element extending from said first portion to between said press-forming members;
    (e) press-forming said second length portion to form a second longitudinally extending series of cogs therein continuing from said first series;
    (f) vulcanizing the second press-formed portion;
    (g) repeating steps (d), (e) and (f) if necessary until a final unformed portion of the belt extending from the last formed series of cogs and disposed between said support members has a length of approximately 60 to 85% of said preselected length;
    (h) clamping the trailing end cogs of said last formed series of cogs;
    (i) longitudinally stretching said final unformed portion in a direction away from the clamped cogs to cause the cumulative length of the clamped trailing end cogs, the final unformed portion, and a preselected number of cogs adjacent the trailing end of said final deformed portion to have a length substantially equal to said preselected length;
    (j) press-forming said stretched final unformed portion to form a final longitudinally extending series of cogs therein to define a continuous series of substantially uniformly spaced cogs along the entire length of said looped element; and
    (k) vulcanizing the said final series of cogs.

2. The method of forming a cogged belt of claim 1 wherein said press-forming members comprise a pair of cooperating mold plates for press-forming of the element portions by compression of the element portions seriatim therebetween.

3. The method of forming a cogged belt of claim 1 wherein said press-forming members comprise a pair of cooperating mold plates for press-forming of the element portions by compression of the element portions seriatim therebetween and means are provided at one end of the mold plates for holding the previously formed cogs adjacent the trailing end of said final unformed portion to maintain said stretched to preselected length during the final vulcanization step.

4. The method of forming a cogged belt of claim 1 wherein the cogs at the opposite ends of each of the series of cogs formed prior to the forming of the final formed series are caused to be only partially vulcanized during the vulcanization of that series and to have vulcanization thereof completed as an incident of subsequent vulcanization of the series of press-formed cogs adjacent thereto.

5. The method of forming a cogged belt of claim 1 wherein the cogs at the opposite ends of each of the series of cogs formed prior to the forming of the final formed series are caused to be only partially vulcanized by subjection thereof to an elevated temperature insufficient to complete vulcanization thereof during the vulcanization of that series and to have vulcanization thereof completed as an incident of subsequent vulcanization of the series of press-formed cogs adjacent thereto.

6. The method of forming a cogged belt of claim 1 wherein said support members axially parallel comprise pulleys.

7. The method of forming a cogged belt of claim 1 wherein said step (i) of stretching the final unformed portion comprises a step of increasing the spacing between said support members.

8. The method of forming a cogged belt of claim 1 wherein said step (i) of stretching the final unformed portion comprises a step of moving one of the support members for increasing the spacing between said support members.

9. The method of forming a cogged belt of claim 1 wherein a pair of mold plates are provided for press-forming of the element portions by compression of the portions seriatim therebetween, one of said mold plates being maintained stationary and the other of the mold plates being moved toward the stationary mold plate to effect the compression of the element portion therebetween.

10. The method of forming a cogged belt of claim 1 wherein a pair of mold plates are provided for press-forming of the element portions by compression of the portions seriatim therebetween, one of the mold plates being formed with a series of grooves to define said series of cogs and the other of the mold plates having a length less than said one mold plate whereby an end portion of the adjacent series of cogs may be received in the grooves outboard of said other mold plate during the press-forming and vulcanization of the series of cogs in the portion between the molds.

11. The method of forming a cogged belt of claim 1 wherein said element comprises a sheet of belt-forming material.

12. The method of forming a cogged belt of claim 1 wherein said element comprises a V-belt preform having a trapezoidal cross section.

13. The method of forming a cogged belt of claim 1 wherein a plurality of said cogged belt structures is concurrently formed.

14. The method of forming a cogged belt of claim 1 wherein said element comprises a sheet of belt-forming material and said sheet is longitudinally slit after the vulcanization of said final series of cogs to form a plurality of cogged belts.

15. The method of forming a cogged belt of claim 1 wherein a pair of mold plates are provided for press-forming of the element portions by compression of the portions seriatim therebetween, one of the mold plates being formed with a series of grooves to define on one surface of said element said series of cogs and the other of the mold plates having a length less than said one mold plate whereby an end portion of the adjacent series of cogs may be received in the grooves outboard of said other mold plate during the press-forming and vulcanization of the series of cogs in the portion between the molds, the face of said other mold plate being beveled at the longitudinally opposite ends thereof for preventing formation of a stepped mark in the surface of said opposite formed cog one surface.

16. The method of forming a cogged belt of claim 1 wherein a pair of mold plates are provided for press-forming of the element portions by compression of the portions seriatim therebetween, one of the mold plates being formed with a series of grooves to define on one surface of said element said series of cogs and the other of the mold plates having a length less than said one mold plate wherein an end portion of the adjacent series of cogs may be received in the grooves outboard of said other mold plate during the press-forming and vulcanization of the series of cogs in the portion between the molds, the face of said other mold plate being beveled at the longitudinally opposite ends thereof for preventing formation of a stepped mark in the surface of said opposite formed cog one surface, the outboard end of each bevel being defined by a radius of approximately 1 to 8 mm.

17. The method of forming a cogged belt structure comprising the steps of:
(a) extending a continuous looped vulcanizable belt preform element about a pair of spaced support members;
(b) press-forming a first preselected length portion of the element disposed between a pair of press-forming member to form a first longitudinally extending series of cogs therein;
(c) vulcanizing the press-formed portion;
(d) advancing the belt to bring a second, similar length portion of the element extending from said first portion to between said press-forming members;
(e) press-forming said second length portion to form a second longitudinally extending series of cogs therein continuing from said first series;
(f) vulcanizing the second press-formed portion;
(g) repeating steps (d), (e) and (f) if necessary until a final unformed portion of the belt extending from the last formed series of cogs and disposed between said support members has a length has a length of less than said preselected length;
(h) clamping the trailing end cogs of said last formed series of cogs;
(i) longitudinally stretching said final unformed portion in a direction away from the clamped cogs to cause the cumulative length of the clamped trailing end cogs, the final unformed portion, and a preselected number of cogs adjacent the trailing end of said final deformed portion to have a length substantially equal to said preselected length;
(j) press-forming said stretched final unformed portion to form a final longitudinally extending series of cogs therein to define a continuous series of substantially uniformly spaced cogs along the entire length of said looped element; and
(k) vulcanizing the said final series of cogs, said steps of press-forming comprising providing a pair of mold plates for press-forming of the element portions by compression of the portions seriatim therebetween, one of the mold plates being formed with a series of grooves to define on one surface of said element said series of cogs and the other of the mold plates having a length less than said one mold plate whereby an end portion of the adjacent series of cogs may be received in the grooves outboard of said other mold plate during the press-forming and vulcanization of the series of cogs in the portion between the molds, said mold plate having a cooled portion at the opposite ends thereof, said cooled portion having a preselected length, the face of said other mold plate being beveled at the longitudinally opposite ends thereof for preventing formation of a stepped mark in the surface of said opposite formed cog one surface.

18. The method of forming a cogged belt of claim 17 wherein the height of said bevel is related to said length of the cooled portion by the relationship:
$(2h/l_c) = 0.05$ to $0.40$ herein $h =$ the height and $l =$ length of cooled portion.

19. The method of forming a cogged belt of claim 1 wherein a pair of mold plates are provided for press-forming of the element portions by compression of the portions seriatim therebetween, one of the mold plates being formed with a series of grooves extending said preselected length to define said series of cogs and the other of the mold plates having a length less than said one mold plate whereby an end portion of the adjacent series of cogs may be received in the grooves outboard of said other mold plate during the press-forming and vulcanization of the series of cogs in the portion between the molds, said step (g) of clamping the end of the last previously formed series of cogs adjacent said final unformed portion thereof comprises a step of clamping said end against the outboard grooves of said one mold plate.

20. Apparatus for forming a cogged belt structure comprising:
- means for extending a continuous looped vulcanizable belt preform element about a pair of axially parallel spaced support members;
- means for press-forming a first preselected length portion of the element disposed between the support members to form a first longitudinally extending series of cogs therein;
- means for vulcanizing the press-formed portion;
- means for causing said press-forming means to press-form a second, similar length portion of the element extending from the first portion and disposed between the support member to form a second longitudinally extending series of cogs therein continuing from the first series;
- means for causing the vulcanizing means to vulcanize the second press-formed portion;
- means for causing the repeating of the press-forming and vulcanizing steps by the press-forming and vulcanizing means until a final unformed portion of the belt extending from the last formed series of cogs and disposed between the support members has a length less than the preselected length;
- means for clamping a portion of the element having at least one cog at the trailing end of the last formed series to said means for press-forming said element;
- means for longitudinally stretching the final unformed portion away from the clamped cog portion of the element to cause said final unformed portion, a preselected number of previously formed cogs adjacent the opposite end of said final unformed portion, and said clamped cog portion to have a cumulative length substantially equal to said preselected length;
- means for causing the press-forming means to press-form the stretched final unformed portion to form a final longitudinally extending series of cogs therein to define a continuous series of substantially uniformly spaced cogs along the entire length of the looped element; and
- means for causing the vulcanizable means to vulcanize the final series of cogs.

21. The method of forming a cogged belt of claim 1 wherein said preselected number of cogs at each of said opposite ends of the final unformed portion is two.

22. The apparatus for forming a cogged belt of claim 20 wherein said preselected number of cogs at each of said opposite ends of the final unformed portion is two.

23. The apparatus for forming a cogged belt of claim 20 further including means for reducing the vulcanizing effect of the vulcanizing means at the opposite ends of the press-forming means to permit desired vulcanization of the cogs press-formed by said ends to be completed only by a plurality of successive partial vulcanizations.

24. The apparatus for forming a cogged belt of claim 20 wherein said means for reducing the vulcanizing effect of the vulcanizing means at said opposite ends of the press-forming means comprises means for cooling said opposite ends.

* * * * *

UNITED STATES PATENT AND TRADEMARK OFFICE
CERTIFICATE OF CORRECTION

PATENT NO. : 4,575,445
DATED : March 11, 1986
INVENTOR(S) : Kunihiro Fujita et al.

It is certified that error appears in the above-identified patent and that said Letters Patent is hereby corrected as shown below:

On the title page, Item [73] Assignee:
Correct name of assignee from "Mitsubishi Belting Ltd." to --Mitsuboshi Belting Ltd.--.

Signed and Sealed this

First Day of July 1986

[SEAL]

Attest:

DONALD J. QUIGG

*Attesting Officer*  *Commissioner of Patents and Trademarks*